(12) United States Patent
Stoeckl et al.

(10) Patent No.: US 6,173,336 B1
(45) Date of Patent: *Jan. 9, 2001

(54) METHOD FOR THE ADMINISTRATION OF DYNAMIC OBJECTS IN A MEANS PROGRAMMED OBJECT-ORIENTED

(75) Inventors: Werner Stoeckl, Baierbrunn; Michael Tietsch, Kaufering, both of (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/522,466

(22) Filed: Aug. 31, 1995

(30) Foreign Application Priority Data

Aug. 31, 1994 (DE) .................................. 44 30 994

(51) Int. Cl.$^7$ .................................. C06F 9/00; C06F 9/46; C06F 15/163
(52) U.S. Cl. .................................................. 709/315
(58) Field of Search ........................ 395/683, 200.15, 395/500, 614; 370/385; 709/310–332

(56) References Cited

U.S. PATENT DOCUMENTS

| | | | | |
|---|---|---|---|---|
| 5,261,080 | * | 11/1993 | Khoyi et al. | 395/500 |
| 5,265,206 | * | 11/1993 | Shackelford et al. | 395/683 |
| 5,317,736 | * | 5/1994 | Bowen | 707/103 |
| 5,388,258 | | 2/1995 | Larsson et al. | 707/104 |
| 5,396,630 | * | 3/1995 | Banda et al. | 395/683 |
| 5,475,817 | * | 12/1995 | Waldo et al. | 395/683 |
| 5,481,718 | * | 1/1996 | Ryu et al. | 395/683 |
| 5,509,123 | * | 4/1996 | Dobbins et al. | 395/200.15 |
| 5,551,035 | | 8/1996 | Arnold et al. | 709/303 |
| 5,602,840 | * | 2/1997 | Gunther et al. | 370/385 |
| 5,729,739 | * | 3/1998 | Cantin et al. | 395/614 |

FOREIGN PATENT DOCUMENTS

| | | |
|---|---|---|
| 0 405 829 A2 | 2/1991 | (EP) . |
| 0 501 610 A2 | 2/1992 | (EP) . |
| 2266172 | 10/1993 | (GB) . |

OTHER PUBLICATIONS

"Software Engineering", Gewald, Haake, Pfadler, 3 verbesserte Auflage, R. Oldenbourg Verlag, (1982), pp. 188–196.

DE–Z Informationstechnit, Siemens AG, Objektorientierte Software–Entwicklung (Object–oriented software development Fundamental turns and procedures), Helmut Becker, pp. 92–101.

(List continued on next page.)

Primary Examiner—Majid Banankhah
Assistant Examiner—P. G. Caldwell
(74) Attorney, Agent, or Firm—Schiff Hardin & Waite

(57) ABSTRACT

In a system, particularly a telecommunication system (TK) that is programmed object-oriented, static and dynamic objects (O1 . . . 3) are instanced by a higher-ranking process or by instanced dynamic objects (O1 . . . 3) and the dynamic objects (O1 . . . 3) are erasable. A statically instanced object manager (MA,MB) is allocated to every class or, respectively, type of dynamic objects (O1 . . . 3) covering like objects (O1 . . . 3). Using the object manager (MA,MB), dynamic objects (O1 . . . 3) are instanced, chained, erased, and the information exchange between the dynamic objects (O1 . . . 3) is controlled, whereby a respective logical object reference (LOR1 . . . 3) is stored in the allocated object manager (MA,MB) when a dynamic object (O1 . . . 3) is instanced. This logical object reference (LOR1 . . . 3) is in turn erased when a dynamic object (O1 . . . 3) is erased. During the course of a call setup and cleardown in telecommunication systems (TK), dynamic objects (O1 . . . 3) are instanced and erased collision-free and the information exchange is initiated collision-free.

18 Claims, 1 Drawing Sheet

OTHER PUBLICATIONS

Booch, Grady; *Object Oriented Design*; Chap 3, pp. 75–131; 1991.*

Ellis et al; *The Annotated CTT Reference Manual*; Chap 12; pp. 261–306; 1990.*

Ellis et al, C++ Reference Manual, pp. 261–295, 1990.*

Geyer et al, Object oriented design method for switching system software, IEEE Digital Library, www/iel.ihs.com; pp. 326–330; May 1993.*

Schneider et al, "Object Oriented system programming for switching systems", IEEE Digital Library www/iel.ihs.com;, pp. 77–81; 1992.*

Maruyama et al; "A concurrent Object–oriented Switching program in Chill", IEEE Digital Library, www/iel.ihs.com; pp. 60–68; Jan. 1991.*

* cited by examiner

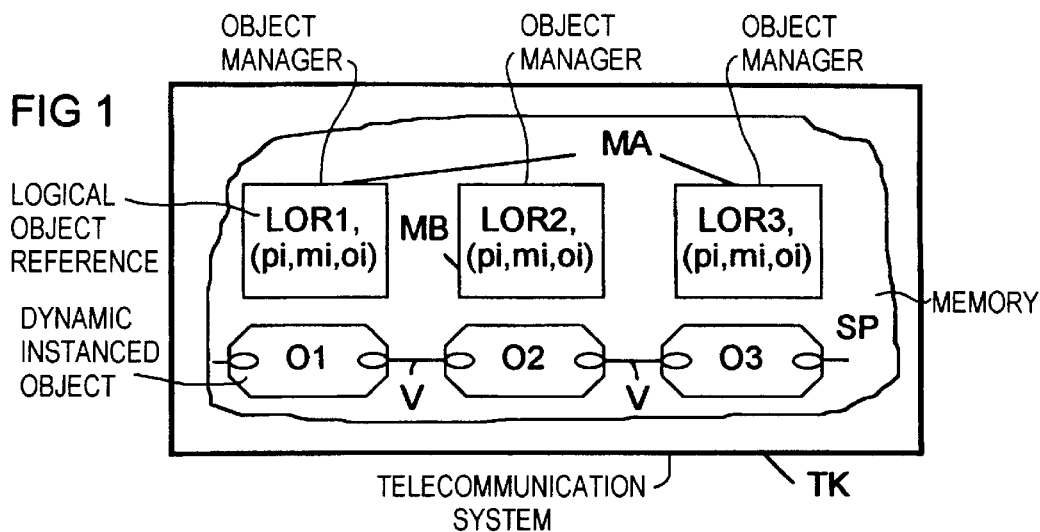
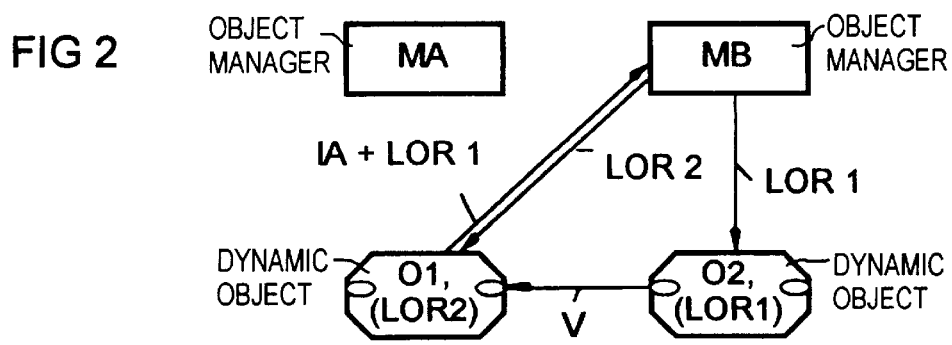
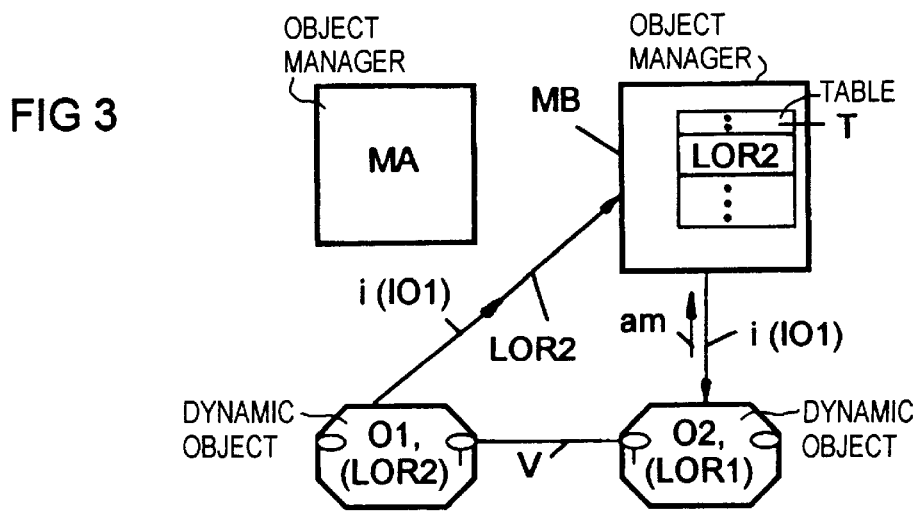

METHOD FOR THE ADMINISTRATION OF DYNAMIC OBJECTS IN A MEANS PROGRAMMED OBJECT-ORIENTED

BACKGROUND OF THE INVENTION

The present invention is directed to a method for the administration of dynamic objects in a programmed object-oriented means wherein static and dynamic objects can be instanced and the dynamic objects can be erased, whereby like objects can be allocated to a class. Instancing of an object refers to forming a logical object reference that includes an object manager, the dynamic object and process identification parameters.

Important properties of object-oriented programming are described in H. Becker, Siemens A G, "Objektorientierte Softwareentwicklung", *Informationstechnik* IT34 (1992) 2. An object thereby represents a limited program with clearly defined functions or, respectively, methods and properties. Like objects, that is, objects having the same functions or, respectively methods and properties, are described in the form of a class description, that is, are assigned to a class. Static or dynamic objects can be instanced within such classes, whereby static objects are permanently present in the system and dynamic objects can be instanced during a program run and can in turn be erased. The instancing and erasing of dynamic objects is initiated by an event from a process ranking higher than the objects or by another dynamic or static object (especially when building and dismantling object chains). Given an employment of object-oriented programs in communication equipment, particularly in switching systems, dynamic objects or, respectively, chained dynamic objects are constantly instanced and subsequently erased during the course of a call setup and cleardown between communication equipment connected to the switching system. Given a connection set up by a plurality of dynamic objects, instances occur wherein dynamic objects are erased almost simultaneously from both sides of a connection (for example, given an approximately simultaneous cleardown of the connection by both communication terminal equipment). Given a chain of dynamic objects in a connection set up between two communication terminal equipment, this means, for example, that objects of this chain are erased without the other objects receiving knowledge of this. When a dynamic object then attempts to address another, erased dynamic object, this leads to collisions that ultimately result in the crash of the system or, respectively, of the communication equipment.

SUMMARY OF THE INVENTION

It is an object of the present invention to avoid the collisions between dynamic objects and erased dynamic objects.

The present invention is a method for the administration of dynamic objects in a means programmed object-oriented wherein static and dynamic objects can be instanced by a higher-ranking process or by instanced dynamic objects and the dynamic objects can be erased, whereby like objects can be allocated to a class.

Important aspects of the inventive method are as follows. A statically instanced object manager is provided for every class of dynamic objects covering like objects. An instancing of a dynamic object is initiated using the respective object manager, whereby a logical object reference that identifies a respectively instanced dynamic object is formed for every dynamic object and stored in the respective object manager. An erasing of a dynamic object is initiated using the respective object manager, whereby the allocated logical object reference in the respective object manager is erased. The dynamic objects are respectively called via the allocated object manager using the logical object reference. The object manager attached to a class, that is, to a type of like dynamic objects represents an additional instance in which there is knowledge about instanced and erased dynamic objects. Since the dynamic objects are called using this additional instance (for example, given an information exchange between dynamic objects) collisions in view of calling erased dynamic objects can be avoided.

The logical object reference is advantageously formed by a manager identification that defines the respective object manager and by an object identification that defines the respective object, whereby a process identification can be added to the manager and object identification given a means with multi-process operation. The manager identification within a process is thereby unambiguously, statically assigned by the appertaining object manager and the object identification within a class is unambiguously, dynamically assigned by the appertaining object manager. A process identification is statically assigned once in the system.

In an advantageous communication chaining of a dynamic object initiating the instancing of a further dynamic object and of the further, instanced dynamic object, the logical object reference formed in the instancing is communicated via the respective object manager to the dynamic object that initiates the instancing and the logical object reference of the dynamic object that initiates the instancing is communicated via the respective object manager to the further, instanced dynamic object. Such a chaining is implemented given an instancing of a dynamic object by another dynamic object. Alternatively, further chainings of a dynamic object with another dynamic object are possible for the higher-ranking process, whereby the dynamic objects thereby affected are informed of the respective logical object reference. The respective dynamic objects are called using these logical object references.

A logical identification is thereby allocated to the instanced object and the object initiating the instancing is informed thereof, whereupon the logical object reference of the object that initiates the instancing is transmitted to the instanced object and, given a communication between the instanced dynamic objects, the objects are called using this logical object reference. Both the instanced as well as the erased objects are known in the object manager of a class and, given a call of an erased dynamic object by another object, the other dynamic object is informed of this erasure. A further significant advantage of the inventive object manager may be seen therein that this can also be employed in an information exchange between the dynamic objects and leads to an enhancement of the addressing reliability between the dynamic objects.

The means is especially advantageously represented by a communication equipment, particularly a processor-controlled telecommunication system. In telecommunication systems, chains of dynamic objects can be instanced and erased during the course of a call setup and cleardown without having the initially cited collisions occurring with respect to the calling of dynamic objects that have already been erased. This means a considerably certain, that is, malfunction-free operation of, in particular, telecommunication systems.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 depicts a chain of instanced dynamic objects;

FIG. 2 depicts an instancing of a dynamic object by another dynamic object; and

FIG. 3 depicts the information exchange between two chained dynamic objects.

DESCRIPTION OF THE PREFERRED EMBODIMENTS

FIG. 1 partially shows a memory SP of a telecommunication system TK wherein three dynamic objects O1 . . . O3 are instanced during the course of a call setup between two connected communication terminal equipment (not shown). The plurality of instanced objects O1 . . . O3 is defined by way of example, whereby five or more dynamic objects are usually instanced.

Let it be assumed for the exemplary embodiment that the first and the third dynamic object O1,O3 represent like dynamic objects and, consequently, a statically instanced object manager MA of the type A is allocated to these two dynamic objects O1,O3. The two rectangles MA shown in FIG. 1 together represent the object manager MA and are intended to indicate that this object manager MA manages the first and third dynamic object O1,O3.

The second dynamic object O2 belongs to a different type (type B in the exemplary embodiment) of dynamic object. Consequently, an object manager MB of type B is allocated to this and to other dynamic objects of type B that are not shown. The connection V between the three dynamic objects O1 . . . O3 indicates a chaining that shall be set forth in greater detail with reference to FIG. 2.

A logical object reference LOR1 . . . 3 is stored in the two object managers MA,MB for each appertaining, instanced dynamic object O1 . . . O3. A stored logical object reference LOR1 . . . 3 means that a dynamic object O1 . . . O3 of the respective type is instanced in the memory SP. For unambiguous identification, a logical object reference LOR1 . . . 3 is formed at least by a manager identification mi and by an object identification oi. A manager identification mi is represented by a memory address or by memory area addresses (not shown ) with which the beginning of the respective object manager program in the memory SP or in the memory area in which the respective object manager program is stored is determined. The respective object manager O1 . . . O3 is called using the memory or memory area addresses. Analogous thereto, the object identification oi is represented by a memory address or by memory area addresses by means of which the respective dynamic object O1 . . . O3 is called by the respective object manager O1 . . . O3. The process identification pi is provided given multi-process operation and is likewise represented by a memory address or by memory area addresses that identify the respective program in the memory SP that realizes a process.

By way of example, both the instancing as well as the chaining of the second dynamic object according to FIG. 1 by or, respectively, with the first dynamic object O1 according to FIG. 1 is described in FIG. 2. Let it be assumed for the exemplary embodiment that the first dynamic object O1 is already instanced by a higher-ranking process (not shown) of the telecommunication system TK and is allocated to the object manager MA of FIG. 1.

The instancing of the second dynamic object O2 is initiated by communicating a initialization request IA and the logical object reference LOR1 of the first dynamic object O1 to the object manager MB identified by the manager identification mi recited in the object reference LOR1 (let an object manager MB of type B be assumed for the exemplary embodiment). After the reception of the initialization request IA, the second dynamic object O2 is instanced in the object manager MB, whereby this second dynamic object O2 represents a object manager O2 of type B. In the instancing of the second dynamic object O2, a logical object reference LOR2 (including the manager, object and, potentially, a process identification pi, mi, oi) is independently formed for this by the object manager MB and is stored in the allocated object manager MB.

The chaining of the two dynamic objects O1,O2 is effected in that the object manager MB communicates the communicated logical object reference LOR1 to the second dynamic object O2 and the logical object reference LOR2 for the second dynamic object O2 formed in the instancing to the first dynamic object O1 and this is stored therein. The stored logical object references LOR1, LOR2 are respectively utilized for calling the dynamic objects O1, O2 in an information exchange. The chaining of the two dynamic objects O1,O2 is indicated by the connection V.

An information exchange between the first and second dynamic objects according to FIG. 1 or, respectively, FIG. 2 is explained with reference to FIG. 3. Let it be assumed for the exemplary embodiment that the dynamic objects O1,O2 shown in FIG. 2 are instanced and the respective logical object references LOR1,LOR2 are stored in the allocated object managers MA,MB. Let it also be assumed for the exemplary embodiment that the first dynamic object O1 should communicate an information i or, respectively, an information object IO to the second dynamic object O2. An information object IO1 represents a dynamic information object IO1 instanced by a dynamic object O1 . . . O3 and in which information i or, respectively, data to be communicated are deposited.

The information exchange between the first and the second dynamic objects O1, O2 is initiated in that the logical object reference LOR2 of the second dynamic object O2 and, subsequently, the information i to be communicated or (insofar as an information packet IO1 is present) the dynamic information object IO1 that has been formed is communicated from the first dynamic object O1 to the object manager MB allocated to the second dynamic object O2. The version with a dynamic information object IO1 is indicated in FIG. 3 by a label limited by brackets.

A check is subsequently carried out in the object manager MB to determine whether a logical object reference LOR2 like that to be communicated is stored in a table T. Given positive check results, that is, at least one corresponding logical object reference LOR2 is stored, the information i or, respectively, the dynamic information object IO1 is forwarded to the second dynamic object O2 and is processed thereat.

When it is found in the check that no logical object reference LOR2 is stored in the table T of the object manager MB, then the communicated information i or, respectively, the information object IO1 are discarded. Additionally, an information (usually an error information) can be communicated to the first dynamic object O1 initiating the information exchange, the lack of a logical object reference LOR2 being communicated to the first dynamic object O1 therewith. The logical object reference LOR2 is no longer stored in the table T of the object manager MB insofar as this, for example, has already been erased by another object, for example the third dynamic object O3 of FIG. 1. An erasure can also have been implemented by the allocated process.

An erasure of a dynamic object O1 . . . O3 by another dynamic object O1 . . . O3 or by a higher-ranking process is initiated via the object manager MA,MB. During the course of the information exchange, the dynamic object to be erased is informed of the planned erasure by the respective dynamic object and the dynamic object to be erased informs the object manager that it is to be erased during the course of a message exchange. The erasure of the respective dynamic object is initiated by the allocated object manager, whereby, given an erasure of the respective dynamic object, the allocated logical object reference stored in the allocated object manager is erased. The erase procedure for, for example, the second dynamic object O2 is indicated in FIG. 3 by the specification of an erase message am.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for administering dynamic objects in a programmed object-oriented system wherein static and dynamic objects are instanced by a higher-ranking process or by instanced dynamic objects, the dynamic objects being erasable, whereby like objects are allocated to a class, comprising the steps of:

allocating a statically instanced object manager to every class of dynamic objects covering like objects;

initiating an instancing of a dynamic object using a respective object manager;

forming a logical object reference by a manager identification that identifies the respective object manager and by an object identification that identifies the respective instanced dynamic object, whereby a process identification is added to the manager and object identification given a system having multi-process operation;

storing the logical object reference in the respective object manager for each dynamic object;

storing the logical object reference for the instanced dynamic object in the instancing dynamic object when the instanced dynamic object was instanced by the instancing dynamic object;

initiating an erasure of a dynamic object using the respective object manager;

erasing the logical object reference allocated in the respective object manager;

calling dynamic objects using the logical object reference via the respective object manager.

2. The method according to claim 1, wherein the method further comprises:

initiating for communication chaining of a dynamic object, the instancing of a further dynamic object and of a further, instanced dynamic object;

communicating the logical object reference, formed in the instancing, via the respective object manager to the dynamic object that initiates the instancing; and communicating the logical object reference of the dynamic object that initiates the instancing via the respective object manager to the further, instanced dynamic object.

3. The method according to claim 1, wherein the method further comprises:

informing, given a planned erasure of a dynamic object, by another dynamic object or by a higher-ranking process, in the respective dynamic object or the higher-ranking process the dynamic object to be erased of the intended erasure during an information exchange, in that the dynamic object to be erased informs the object manager that it is to be erased during a message exchange, and in that the erasure of the respective dynamic object is initiated by the allocated object manager; and erasing given an erasure of the respective dynamic object, the allocated logical object reference stored in the allocated object manager.

4. The method according to claim 1, wherein the method further comprises:

communicating, given an information exchange between chained dynamic objects, via the dynamic object that initiates the information exchange, the logical object reference of the further dynamic object to the allocated object manager;

performing a check in the allocated object manager to determine whether a logical object reference corresponding to the communicated logical object reference is stored in the object manager; and, calling, given a stored logical object reference, the dynamic object defined by the logical object reference and initiating the information exchange via the allocated object manager.

5. The method according to claim 4, wherein a dynamic object that communicates information instances a dynamic information object for the information to be communicated; and wherein, given an information exchange from a dynamic object communicating information to a dynamic object defined by the logical object reference, the dynamic information object is given to the object manager allocated to the defined dynamic object and is then communicated to the dynamic object defined by the object identification recited in the logical object reference.

6. The method according to claim 4, wherein, insofar as no corresponding, stored logical object reference is found in the object manager during the course of an information exchange, given a check of a communicated logical object reference, a message indicating the lack of a corresponding, stored logical object reference is communicated to the dynamic object that communicated the logical object reference.

7. The method according to claim 4, wherein the communicated information or the dynamic information object are discarded if no corresponding, stored logical object reference is found in the object manager during the course of an information exchange given a check of a communicated logical object reference.

8. The method according to claim 1, wherein the method further comprises:

representing the manager identification by an address information indicating a memory area of the object manager;

representing the object identification by an address information indicating a memory area of the instanced dynamic object; and calling, in an information exchange, the allocated object manager and the instanced dynamic object using the address information.

9. The method according to claim 1, wherein the system is formed by communication equipment.

10. The method according to claim 9 wherein the system is formed by a processor-controlled telecommunication system.

11. A method for administering dynamic objects in a programmed object-oriented system wherein static and dynamic objects are instanced by a higher-ranking process or by instanced dynamic objects, the dynamic objects being erasable, whereby like objects are allocated to a class, comprising the steps of:

- allocating a statically instanced object manager to every class of dynamic objects covering like objects;
- initiating an instancing of a dynamic object using a respective object manager;
- forming a logical object reference by a manager identification that identifies the respective object manager and by an object identification that identifies the respective instanced dynamic object, whereby a process identification is added to the manager and object identification given a system having multi-process operation;
- storing the logical object reference in the respective object manager for each dynamic object;
- initiating an erasure of a dynamic object using the respective object manager;
- erasing the logical object reference allocated in the respective object manager;
- calling dynamic objects using the logical object reference via the respectively allocated object manager;
- initiating for communication chaining of a dynamic object, the instancing of a further dynamic object and of a further, instanced dynamic object;
- communicating the logical object reference, formed in the instancing, via the respective object manager to the dynamic object that initiates the instancing;
- storing the logical object reference formed in the instancing in the dynamic object that initiates the instancing;
- communicating the logical object reference of the dynamic object that initiates the instancing via the respective object manager to the further, instanced dynamic object; and
- storing the logical object reference of the dynamic object that initiates the instancing in the further instanced dynamic object.

12. The method according to claim 11, wherein the method further comprises:

- communicating, given an information exchange between chained dynamic objects, via the dynamic object that initiates the information exchange, the logical object reference of the further dynamic object to the allocated object manager;
- performing a check in the allocated object manager to determine whether a logical object reference corresponding to the communicated logical object reference is stored in the object manager; and,
- calling, given a stored logical object reference, the dynamic object defined by the logical object reference and initiating the information exchange via the allocated object manager.

13. The method according to claim 12, wherein a dynamic object that communicates information instances a dynamic information object for the information to be communicated; and wherein, given an information exchange from a dynamic object communicating information to a dynamic object defined by the logical object reference, the dynamic information object is given to the object manager allocated to the defined dynamic object and is then communicated to the dynamic object defined by the object identification recited in the logical object reference.

14. The method according to claim 12, wherein, insofar as no corresponding, stored logical object reference is found in the object manager during the course of an information exchange, given a check of a communicated logical object reference, a message indicating the lack of a corresponding, stored logical object reference is communicated to the dynamic object that communicated the logical object reference.

15. The method according to claim 11, wherein the method further comprises:

- informing, given a planned erasure of a dynamic object, by another dynamic object or by a higher-ranking process, in the respective dynamic object or the higher-ranking process the dynamic object to be erased of the intended erasure during an information exchange, in that the dynamic object to be erased informs the object manager that it is to be erased during a message exchange, and in that the erasure of the respective dynamic object is initiated by the allocated object manager; and
- erasing given an erasure of the respective dynamic object, the allocated logical object reference stored in the allocated object manager.

16. A method for administering dynamic objects in a programmed object-oriented system wherein static and dynamic objects are instanced by a higher-ranking process or by instanced dynamic objects, the dynamic objects being erasable, whereby like objects are allocated to a class, comprising the steps of:

- allocating a statically instanced object manager to every class of dynamic objects covering like objects;
- initiating an instancing of a dynamic object using a respective object manager;
- forming the logical object reference by a manager identification that identifies the respective object manager and by an object identification that identifies the respective instanced dynamic object, a process identification being added to the manager identification and object identification given a system having multi-process operation;
- representing the manager identification by an address information indicating a memory area of the object manager;
- representing the object identification by an address information indicating a memory area of the instanced dynamic object;
- storing the logical object reference in the respective object manager for each dynamic object;
- storing the logical object reference for the instanced dynamic object in the instancing dynamic object when the instanced dynamic object was instanced by the instancing dynamic object;
- initiating an erasure of a dynamic object using the respective object manager;
- erasing the logical object reference allocated in the respective object manager;
- calling dynamic objects using the logical object reference via the respectively allocated object manager and calling, in an information exchange, the allocated object manager and the instanced dynamic object using the address information.

17. The method according to claim 16, wherein the method further comprises:
- initiating for communication chaining of a dynamic object, the instancing of a further dynamic object and of a further, instanced dynamic object;
- communicating the logical object reference, formed in the instancing, via the respective object manager to the dynamic object that initiates the instancing; and
- communicating the logical object reference of the dynamic object that initiates the instancing via the respective object manager to the further, instanced dynamic object.

18. The method according to claim 16, wherein the method further comprises:
- informing, given a planned erasure of a dynamic object, by another dynamic object or by a higher-ranking process, in the respective dynamic object or the higher-ranking process the dynamic object to be erased of the intended erasure during an information exchange, in that the dynamic object to be erased informs the object manager that it is to be erased during a message exchange, and in that the erasure of the respective dynamic object is initiated by the allocated object manager; and
- erasing given an erasure of the respective dynamic object, the allocated logical object reference stored in the allocated object manager.

\* \* \* \* \*